United States Patent [19]

Tanioka

[11] Patent Number: 5,572,606
[45] Date of Patent: Nov. 5, 1996

[54] IMAGE INFORMATION PROCESSING METHOD AND APPARATUS THEREFOR WITH MULTI-LEVEL DATA CAPABILITY

[75] Inventor: Hiroshi Tanioka, Tokyo, Japan

[73] Assignee: Canon Kabushiki Kaisha, Tokyo, Japan

[21] Appl. No.: 257,428

[22] Filed: Jun. 8, 1994

Related U.S. Application Data

[63] Continuation of Ser. No. 59,343, May 12, 1993, abandoned, which is a continuation of Ser. No. 703,710, May 21, 1991, abandoned, which is a continuation of Ser. No. 325,020, Mar. 20, 1989, abandoned, which is a continuation of Ser. No. 918,914, Oct. 15, 1986, abandoned.

[30] Foreign Application Priority Data

Oct. 18, 1985 [JP] Japan .................................. 60-230945

[51] Int. Cl.⁶ .................................................. G06K 9/38
[52] U.S. Cl. ........................ 382/270; 358/262.1; 358/429; 358/466
[58] Field of Search .................................. 382/50, 52, 54, 382/270, 272, 254; 358/238, 440, 448, 464, 465, 466, 266.1, 429, 447; 348/283, 572–574

[56] References Cited

U.S. PATENT DOCUMENTS

| | | | |
|---|---|---|---|
| 4,074,231 | 2/1978 | Yajima et al. | 382/54 |
| 4,125,858 | 11/1978 | Hounsfield et al. | 382/54 |
| 4,366,507 | 12/1982 | Mori | 382/50 |
| 4,437,122 | 3/1984 | Walsh et al. | 382/54 |
| 4,476,495 | 10/1984 | Fujisawa et al. | 358/262.1 |
| 4,486,785 | 12/1984 | Lasher et al. | 358/447 |
| 4,517,604 | 5/1985 | Lasher et al. | 358/262.1 |
| 4,544,264 | 10/1985 | Bassetti et al. | 358/447 |
| 4,547,811 | 10/1985 | Ochi et al. | 358/283 |
| 4,593,325 | 6/1986 | Kannapell et al. | 382/50 |
| 4,668,995 | 5/1987 | Chen et al. | 382/54 |
| 4,686,579 | 8/1987 | Sakamoto | 358/457 |
| 4,723,173 | 2/1988 | Tanioka | 358/457 |
| 4,734,786 | 3/1988 | Minakawa et al. | 358/457 |
| 4,758,897 | 7/1988 | Hiratsuka et al. | 358/457 |
| 4,805,226 | 2/1989 | Guebey | 382/54 |

FOREIGN PATENT DOCUMENTS

59-163959  9/1984  Japan .................................. H04N 1/40

*Primary Examiner*—Joseph Mancuso
*Attorney, Agent, or Firm*—Fitzpatrick, Cella, Harper & Scinto

[57] ABSTRACT

A method and an apparatus for processing image information by converting binary image data into multi-level image data. After conversion the image data are subjected to a smoothing process to avoid apparent loss in image quality.

19 Claims, 4 Drawing Sheets

| 0 | 0 | 0 | 0 | 0 | 0 |
|---|---|---|---|---|---|
| 0 | 0 | 16 | 16 | 0 | 0 |
| 0 | 0 | 16 | 16 | 0 | 0 |
| 0 | 0 | 16 | 16 | 0 | 0 |
| 0 | 0 | 16 | 16 | 0 | 0 |
| 0 | 0 | 16 | 16 | 0 | 0 |

FIG. 5A

| 0 | 0 | 4 | 4 | 0 | 0 |
|---|---|---|---|---|---|
| 0 | 4 | 8 | 8 | 4 | 0 |
| 0 | 4 | 12 | 12 | 4 | 0 |
| 0 | 4 | 12 | 12 | 4 | 0 |
| 0 | 4 | 12 | 12 | 4 | 0 |
| 0 | 4 | 12 | 12 | 4 | 0 |

FIG. 5B

IMAGE INFORMATION PROCESSING METHOD AND APPARATUS THEREFOR WITH MULTI-LEVEL DATA CAPABILITY

This application is a continuation of application Ser. No. 08/059,343, filed May 12, 1993, which was a continuation of application Ser. No. 07/703,710, filed May 21, 1991, which was a continuation of application Ser. No. 07/325,020, filed Mar. 20, 1989, which was a continuation of application Ser. No. 06/918,914, filed Oct. 15, 1986 all now abandoned.

BACKGROUND OF THE INVENTION

1. Field of the Invention

The present invention relates to an image information processing method and an apparatus therefor, and, in particular, to such method and apparatus for converting binary image data into ternary or multi-level image data.

2. Related Background Art

Conventionally, an input device for entering image information to a digital image data processing apparatus, particularly a copying machine, a facsimile or a personal computer achieves image reading with a high resolving power and with satisfactory tonal rendition through the use of a solid state image sensor represented by a CCD. In the case of reproducing the original image from thus read image data with a binary printer, there is usually employed a suitable binarizing method according to the nature of the image, for example a binarizing method with a low-frequency threshold value for an image area of line-tone images, and a binarizing method with a high-frequency threshold value (pseudo-continuous tone reproduction) as represented by the dither method for an image area including continuous tone.

Such data compression/expansion technology is based on a concept, for an original image containing both line and continuous tone images, i.e., an original image containing both characters or lines and continuous tone image, of sacrificing the tonal information for an image area of characters and lines where emphasis should be given to the line-tone information, and sacrificing the line-tone information for an image area including continuous tone where the emphasis should be given to the tonal information. Consequently, in the case of reproducing the original image with a multi-level printer capable of recording three or more levels for each pixel, the image quality appears macroscopically satisfactory but appears reduced as the resolving power of the printer is improved, due to low resolving power in the tonal image area and high image contrast in the line-tone image area.

SUMMARY OF THE INVENTION

An object of the present invention is to provide an image information processing method and an apparatus which is not associated with the above-explained drawbacks.

One aspect of the present invention is an image information processing method and an apparatus therefor capable of reproduction of intermediate density information lost at the edge portion of characters or lines, by expanding binary data in the line-tone image area into multi-level data and effecting a smoothing step.

Another aspect of the present invention is an image information processing method and an apparatus therefor, capable of avoiding discontinuity in density change, by expanding binary data in the tonal image area into multi-level data and effecting a smoothing step.

The foregoing and, other objects, features and advantages of the present invention will become fully apparent from the following detailed description, which is to be taken in conjunction with the attached drawings.

DETAILED DESCRIPTION OF THE PREFERRED EMBODIMENTS

In the following the present invention will be clarified in detail by an embodiment thereof shown in the attached drawings.

Figure 1:
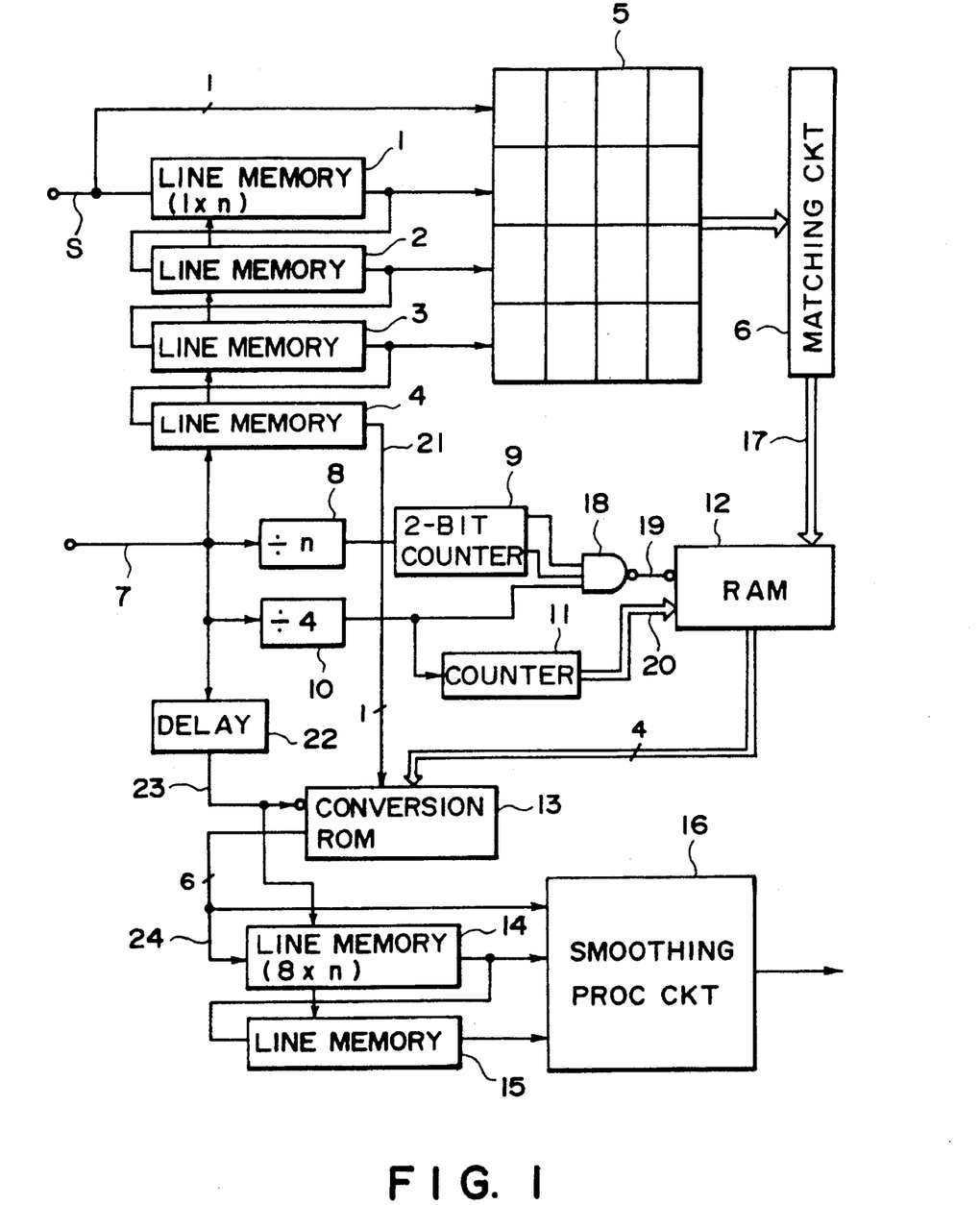
FIG. 1 is a block diagram of data conversion and smoothing process blocks of an information process unit.

FIG. 1 is a block diagram of an information processing unit of an image information processing apparatus embodying the present invention, wherein are provided a matching circuit 6 functioning as multi-level data converting means; and a conversion ROM 13; a data latch circuit 5; line memories 14, 15 functioning as smoothing means; and a smoothing process circuit 16.

In the circuit shown in FIG. 1, the data latch circuit 5 retains 4×4 pixels of the input pixel data, then the matching circuit 6 discriminates the nature of the image data, and the conversion ROM 13 effects conversion into multi-level data according to the nature of the image data.

The data converted into multi-level data are compared with those of two other lines, and the smoothing process circuit 16 effects a smoothing step with a 3×3 matrix.

In the following there will be explained the multi-level converting block and the smoothing process block, while making reference to FIGS. 1 and 2.

Figure 2:
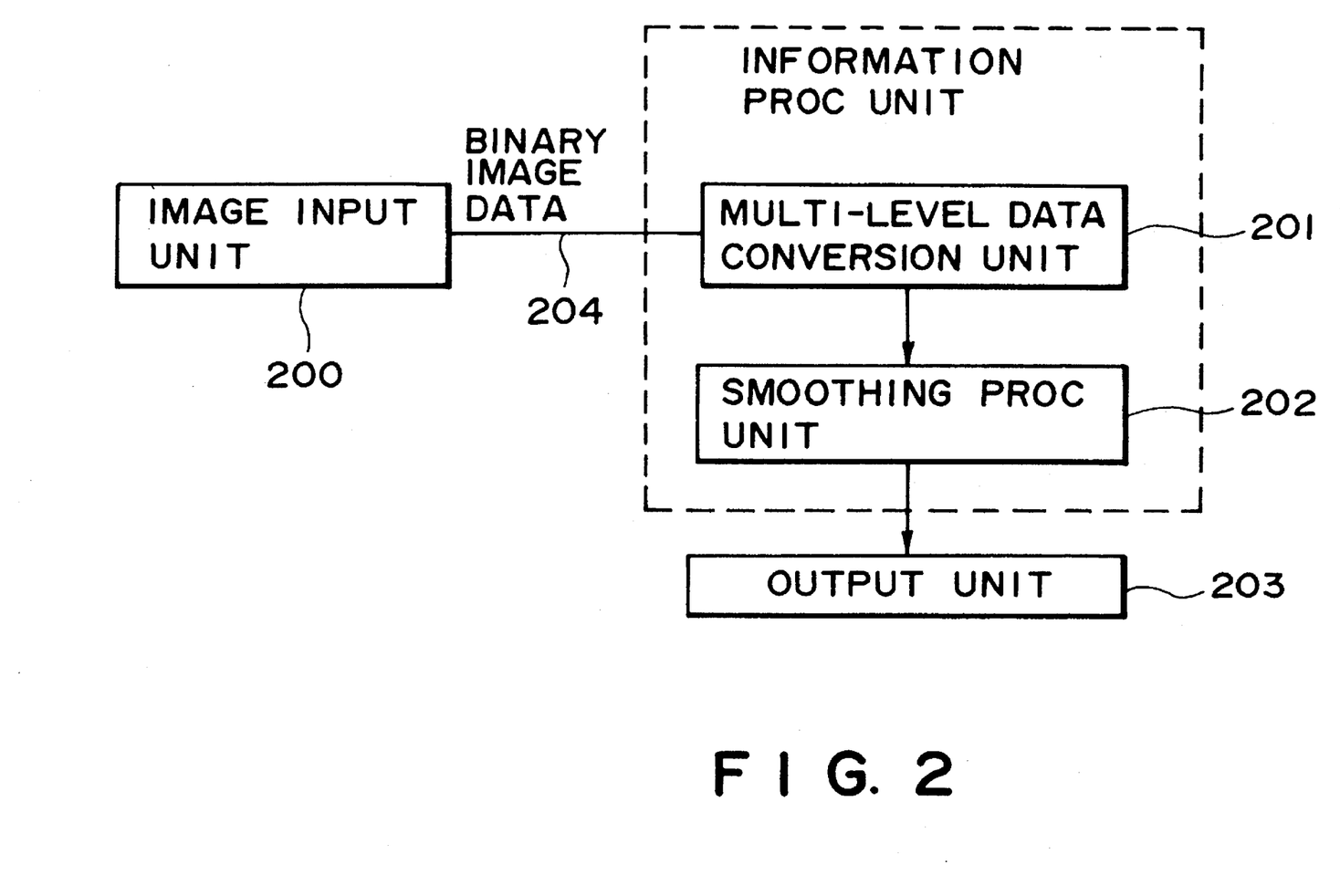
FIG. 2 is a block diagram of an image processing apparatus embodying the present invention.

FIG. 1 is a block diagram of the multi-level data conversion block and the smoothing process block of an image information processing apparatus embodying the present invention, while FIG. 2 shows the schematic structure of the image information processing apparatus of said embodiment, wherein is provided an image input unit 200 for reading image information, for example, with a CCD, binarizing the image information according to the line-tone image areas and the tonal image areas of the original image, and releasing binary image data 204. Such binarizing method according to the image characteristics is detailed in the U.S. patent application Ser. No. 786,645, filed Oct. 11, 1985, in the names of S. Sugiura and Y. Masuda, assigned in common with the present applications.

There are also provided a multi-level data conversion unit 201 for converting binary image data 204 into multi-level image data; a smoothing process unit 202 for smoothing said multi-level data; and an output unit 203 for reproducing the original image from said image data.

In FIG. 1, binary image data binarized with different threshold value groups according to the nature of image in the image input unit 200 are supplied from a source S into data delaying line memories 1, 2, 3 of 1×n bits each, wherein n is the number of pixels in a line, and are respectively delayed by a line from the input. Also binary image data of 4 lines are supplied to the data latch circuit 5 composed of 4×4 D-type flip-flops. In this manner it is rendered possible to simultaneously refer to binary image data of sixteen mutually neighboring bits.

In the present embodiment the tonal image area of the image signal consists of image data obtained by a dither process utilizing a 4×4 basic matrix, and these 16 pixels are subjected to a pattern matching process synchronized with the dither pattern by a matching circuit 6.

Also there are shown a pixel clock signal 7 synchronized with image data; a frequency divider 8 for dividing the frequency of the pixel clock signal into 1/n, wherein n is a multiple of 4 and is equal to the number of pixels in a line; a 2-bit counter 9 for counting the number of lines in response to the output of the frequency dividers 8; a frequency divider 10 for dividing the frequency of the pixel clock signal 7 into ¼; a counter 11 for counting the signal thus divided by 4; and a RAM 12 for storing the coincidence state of the matching circuit 6 or the pixel densities as will be explained later.

There are further shown a conversion ROM 13 for conversion into multi-level data; line memories 14, 15 for respectively storing multi-level data of a line; and a smoothing process circuit 16 for smoothing the multi-level data.

After the entry of binary image data of three lines into the line memories 1–3 and of binary image data of 4 pixels of the fourth line, the data latch circuit 5 contains image data of 4×4 pixels. Based on the binary image data of said 16 pixels, the matching circuit 6 discriminates the image as will be explained later, and releases a coincidence signal of one bit and converted density data of 4 bits, as data 17.

The 2-bit counter 9, having counted three lines in this state, releases "H" level output signals, whereby a write-in signal 19 is released by an AND gate 18 at every fourth pixel clock pulse. The counter 11 counts out at every fourth pixel clock pulse and releases an output signal 20 which is supplied, as an address signal, to the RAM 12. Consequently the RAM 12 stores the coincidence signal of 1 bit and converted density data of 4 bits at every fourth pixel clock pulse in the fourth line.

Upon completion of the data storage into the RAM 12, the content of the line memory 3 is transferred to the line memory 4. The RAM 12 is normally in the read-out mode unless the write-in mode is specified, and the pixel data released from the line memory 4 and the output of the RAM 12 are supplied, as address signals, to the conversion ROM 13. Consequently 4-bit density data read in succession by the output of the counter 11 and the content of the conversion ROM 13 addressed by the pixel data 21 are read in synchronization with a clock signal 23, obtained by delaying the pixel clock signal 7 with a delay circuit 22. In this manner the data of each pixel are converted into multi-level data.

In the present embodiment the conversion ROM 13 releases a 6-bit output signal, and each of the line memories 14, 15 is composed of an 8-bit RAM. The smoothing process circuit 16 receives multi-level data of three lines and effects a smoothing process as will be explained later, on 4 image data neighboring in the main and sub-scanning directions.

Figure 3:
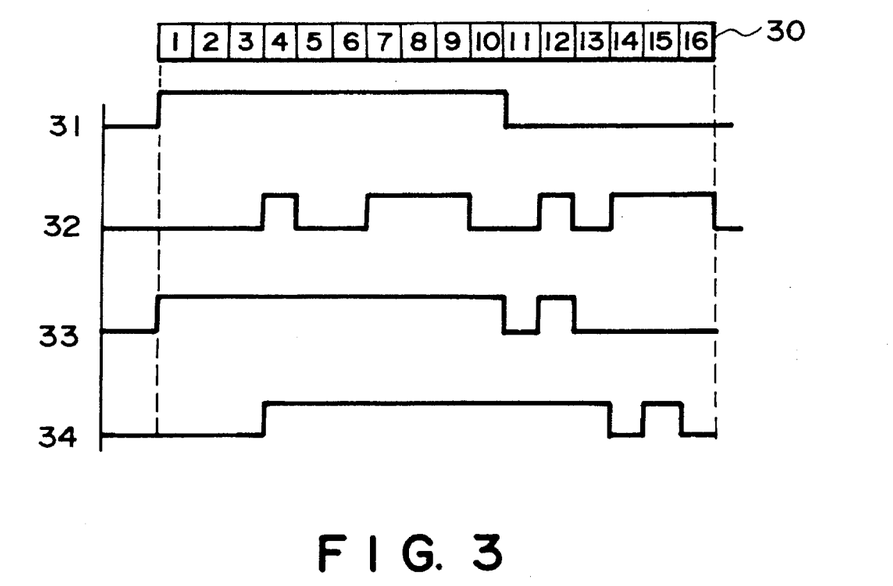
FIG. 3 is a chart of an example of image data arranged in the order of dither threshold values.

Now reference is made to FIG. 3 for explaining the matching circuit.

FIG. 3 shows example of 16 pixel data stored in the data latch circuit 5 in FIG. 1, arranged one-dimensionally in the order of dither threshold values.

Reference numeral 30 indicates such sixteen dither threshold values of a 4×4 dither matrix for use in a binarizing process conducted by allotting an "H" level when the image data of a given pixel exceeds the of the corresponding element of the dither matrix value.

A pattern 31 had a correlation with the dither threshold values, and is therefore identified as a continuous tone image of a density level 10. On the other hand, a pattern 32 has little correlation with the dither threshold values and is therefore considered a line-tone image area consisting of characters and lines. However, as the continuous tone area in the usual image contains a certain amount of line-tone information, the density change in such area may appear as shown in pattern 33 rather than in the simpler pattern shown in above-explained pattern 31. Conversion of the pattern 33 into the multi-level data is not as easy as in the case of the pattern 31. More specifically, pattern 33 might be converted into a density level of either 10, 11 or 12, and therefore it is necessary to determine the optimum density in relation to the neighboring blocks, since otherwise there may result a difference in density level among neighboring blocks. This is done by the smoothing process circuit 16, as described below.

A pattern 34, though similar to the pattern 33, is identified as not being continuous tone image, since the "L" levels are present for the threshold values 1–3 while the "H" levels are present for the larger threshold values.

This algorithm allows one to convert all the 16 pixels of the pattern 31 to the density level 10, or to convert, in the case of the patterns 32 and 34, the "H" level pixels to the highest density level 16 and the "L" level pixels to the lowest density level 0. On the other hand, if a pattern of a density charge as represented by the pattern 33 is uniformly converted into one density as in the case of the pattern 31, there will result a discontinuity relative to the neighboring blocks. Such discontinuity is corrected and smoothed by the smoothing process circuit 16.

Now reference is made to FIGS. 4A, 4B, 5A and 5B for explaining the smoothing process.

Figure 4A:
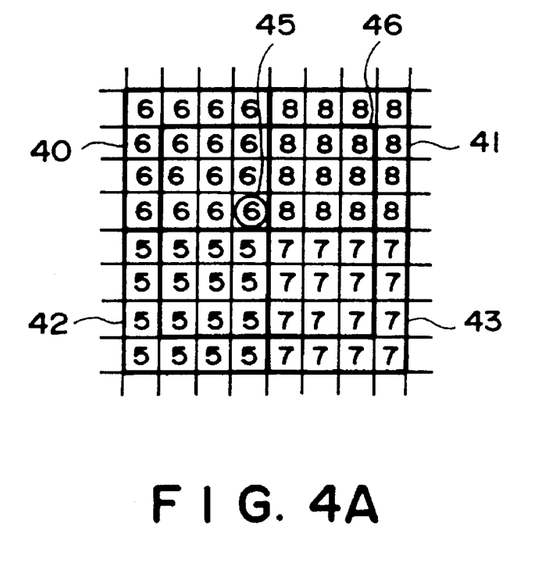
FIG. 4A is a view showing an example of a continuous tone image area converted into multi-level data.

FIG. 4A shows an example of image data of 4 blocks converted into multi-level data from a continuous tone image area.

Said image data are converted into the blocks 40–43 of the density levels 6, 8, 5 and 7, evidently indicating the presence of significant density changes in the vicinity of said blocks. Consequently the image shows a deterioration in the resolving power resulting from the assignment of a uniform density to all the 16 pixels.

Figure 4B:
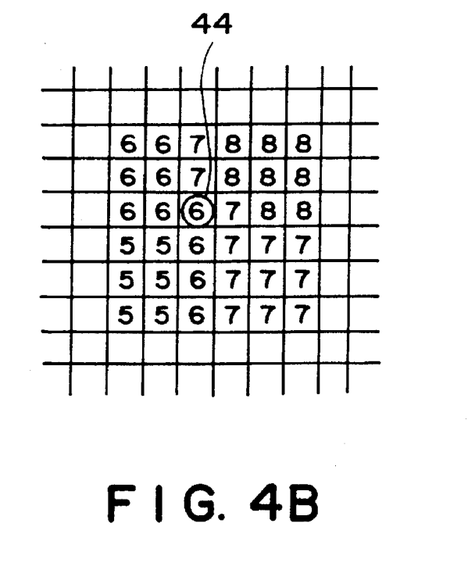
FIG. 4B is a view showing an example of smoothing process applied on the multi-level data shown in FIG. 4A.

FIG. 4B shows an example of smoothing according to the present embodiment, applied as a post-treatment to said image, wherein a simple smoothing is applied to 4 neighboring pixels not including the contemplated pixel. For example the density level of a pixel 44 is determined as "6", according to the average value of four multi-level data neighboring to a pixel 45 in FIG. 4A in the main and sub scanning directions. The data shown in FIG. 4B are obtained by such smoothing process applied to each pixel of the 6×6 matrix 46 shown in FIG. 4A.

Since this smoothing process is conducted in an area smaller than the conversion unit (4×4) to the intermediate density levels, it is rendered possible to smoothly changing density data without sacrificing the resolution in said area, and thus to improve the image quality after the data expansion.

Figure 5A:
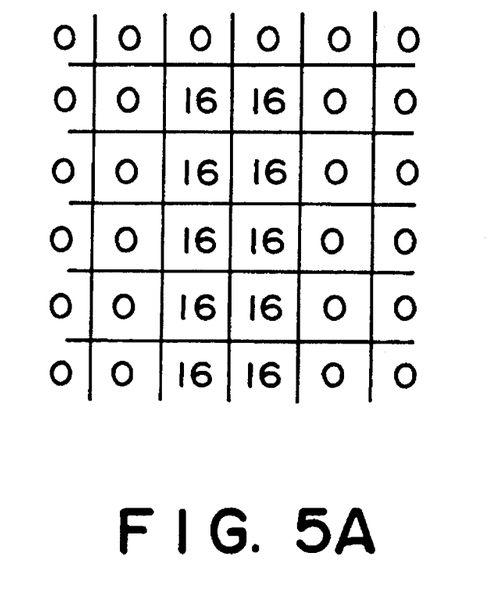
FIG. 5A is a view showing an example of a line-tone image area converted into multi-level data.
Figure 5B:
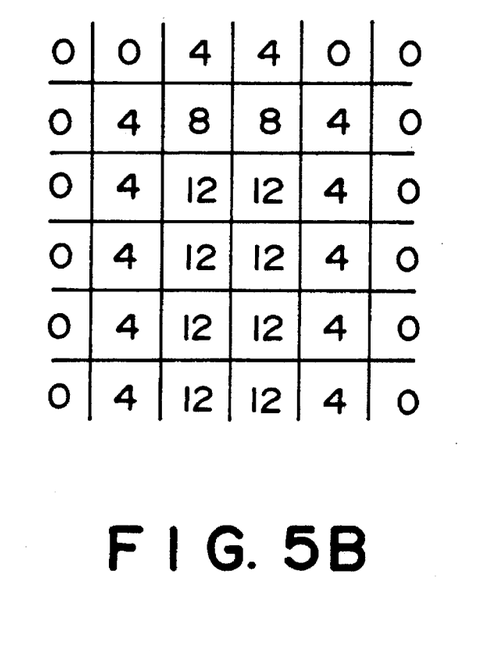
FIG. 5B is a view showing an example of smoothing process applied on the multi-level data shown in FIG. 5B.

This process is applied to the entire image area. Therefore, in a line-tone image area, as shown in FIG. 5A, a smoothing occurs in the edge areas as shown in FIG. 5B, so that an excessive contrast in the characters and lines in the reproduced image is reduced, so that the multi-level reproduced image approaches the original image in quality.

In the present embodiment binary image data obtained by a dither method are expanded into multi-level image data by a pattern matching method utilizing a basic block consisting of 4×4 pixels of the original image, but the present invention is not limited to the expansion from binary data into multi-level data and is effectively applicable to so-called block encoding in which data encoding and decoding are conducted by allotting single multi-level data to plural pixels of the original image.

As explained in the foregoing, the present embodiment has advantages of correcting, with a simple structure, the digitizing errors in an image converted into multiple levels by sacrificing the resolving power, thus improving the image quality and reproducing the line-tone image in a form approximately close to the original image.

As explained in the foregoing, the present invention allows conversion of binary data into multi-level data with a simple structure and improves the quality of the image reproduced from such multi-level data.

The present invention is not limited to the foregoing embodiment but is subject to various applications and modifications within the scope and spirit of the appended claims.

What is claimed is:

1. An image information processing apparatus comprising:

input means for inputting a binary image signal and an image clock signal for each picture element, the binary image signal being one which has been binarization-processed using a predetermined matrix;

conversion means for converting the binary image signal input by said input means into a multi-level digital image signal of three or more levels, the multi-level digital image signal representing density data for each picture element, and said conversion means converting the binary image signal into the multi-level digital image signal without increasing the number of picture elements, wherein said conversion means further comprises line memories for delaying the binary image signal by a quantity corresponding to plural lines and performs the conversion in real time synchronously with the image clock signal using said line memories, and wherein said conversion means includes means for discriminating whether the binary image signal is a signal obtained by binarizing halftone portion or a signal obtained by binarizing a character portion and converts the binary image signal into a multi-level digital image signal in accordance with a discrimination result provided by said discrimination means; and smoothing means for the multi-level digital image signal obtained in said conversion means, wherein said smoothing means performs smoothing processing of the multi-level digital image signal for an area a size of which is smaller than a size of said predetermined matrix.

2. An image information processing apparatus according to claim 1, wherein said conversion means performs the conversion operation on the binary image signal for each area corresponding to the size of said predetermined matrix.

3. An image information processing apparatus according to claim 2, further comprising judgment means for inputting the binary image signal for each area corresponding to the size of said predetermined matrix and judging a tone of image represented by the binary image signal for that area, and wherein said conversion means performs the conversion in accordance with a judging result obtained by said judgment means.

4. An image information processing apparatus according to claim 1, wherein said predetermined matrix includes a dither matrix.

5. An image formation processing method comprising the steps of:

inputting method comprising the steps of:

inputting a binary image signal for each picture element, wherein the binary image signal is one which has been binarization-processed using a predetermined threshold matrix;

converting the binary image signal input in said inputting step into a multi-level digital image signal of three or more levels, the multi-level digital image signal representing density data for each picture element, said converting step converting the binary image signal into the multi-level digital image signal without increasing the number of picture elements, wherein said converting step is preformed in real time synchronously with the image clock signal using line memories the binary image signal by a quantity corresponding to plural lines, and wherein said converting step further includes the step of discriminating whether the binary image signal is a signal obtained by binarizing a halftone portion or a signal obtained by binarizing a character portion, and the binary image signal is converted into a multi-level digital image signal in accordance with a discrimination result obtained in said discriminating step; and smoothing the multi-level image signal obtained in said conversion step, wherein, in said smoothing step, the smoothing processing of the multi-level digital image signal is performed for an area a size of which is smaller than a size of the threshold matrix.

6. An image information processing method according to claim 5, wherein, in said conversion step, the conversion operation on the binary image signal is performed for each area corresponding to the size of the predetermined threshold matrix.

7. An image information processing method according to claim 6, further comprising a judgment step in which the binary image signal is input for each area corresponding to the size of the predetermined threshold matrix and a tone of image represented by the binary image signal is judged, and wherein, in said conversion step, the conversion is performed in accordance with a judging result obtained in said judgment step.

8. An image information processing method according to claim 5, wherein the predetermined threshold matrix includes a dither matrix.

9. An image processing method comprising the steps of:

supplying n-value image data for each picture element and an image clock signal; and discriminating, in a case where m-value image data representing a density of each picture element is estimated from the n-value image data (where m>n), a two-dimensional pattern of the n-value image data and estimating the m-value image data using the discriminated pattern as a parameter, wherein said pattern discriminating step is performed in real time synchronously with the image clock signal using line memories for delaying the image data by a quantity corresponding to plural lines, wherein, in the case of discriminating the m-value image data according to the n-value image data, the number of picture elements is not increased, and wherein said pattern discriminating step further includes a second discriminating step of discriminating whether the n-value image data is a signal obtained by binarizing a halftone portion or a signal obtained by binarizing a character portion, and further comprises the step of converting the n-value image data into the m-value digital image data in accordance with a discriminating result obtained in said second discriminating whether step.

10. A method according to claim 9, wherein the n-value image data is halftone-processed binary data.

11. A method according to claim 9, further comprising: smoothing the inferred image data.

12. A method according to claim 9, wherein the two dimensional pattern of the n-value image data is discriminated in a pattern matching method.

13. A method according to claim 9, wherein said discrimination step is executed by a read only memory table.

14. A method according to claim 9, wherein the n-value image data is dither-processed data.

15. An image processing method comprising the steps of:

supplying n-value image data for each picture element and an image clock signal; and estimating m-value image data representing a density of each picture element from the supplied n-value image data (where m>n), wherein said estimating step is performed in real time synchronously with the image clock signal using line memories for delaying the image data by a quantity corresponding to plural lines, wherein said estimating step further includes the step of discriminating whether the n-value image data is a signal obtained by binarizing a halftone portion or a signal obtained by binarizing a character portion, and wherein, in said estimating step, the n-value image data is converted into a m-value digital image data in accordance with a discriminating result obtained in said discriminating step.

16. A method according to claim 15, wherein the n-value image data is halftone-processed binary data.

17. A method according to claim 15, further comprising the step of smoothing the m-value image data produced in said estimating step.

18. A method according to claim 15, wherein said discriminating step is executed by means of a read only memory table.

19. A method according to claim 15, wherein the n-value image data is dither-processed data.

* * * * *

UNITED STATES PATENT AND TRADEMARK OFFICE
CERTIFICATE OF CORRECTION

PATENT NO. : 5,572,606  Page 1 of 2
DATED : November 5, 1996
INVENTOR(S) : HIROSHI TANIOKA It is certified that error appears in the above-indentified patent and that said Letters Patent is hereby corrected as shown below:

COLUMN 1:

Line 10, "Oct. 15, 1986" should read --Oct. 15, 1986,--.

COLUMN 2:

Line 3, "and," should read --and--.

COLUMN 3:

Line 22, "dividers" should read --divider--.

COLUMN 4:

Line 1, "example" should read --examples--.
Line 7, "the of" should read --the value of--.
Line 8, "matrix value." should read --matrix.--
Line 27, "being" should read --being a--.

UNITED STATES PATENT AND TRADEMARK OFFICE
CERTIFICATE OF CORRECTION

PATENT NO. : 5,572,606
DATED : November 5, 1996
INVENTOR(S) : HIROSHI TANIOKA

It is certified that error appears in the above-indentified patent and that said Letters Patent is hereby corrected as shown below:

<u>COLUMN 5</u>:

Line 50, "binarizing halftone" should read --binarizing a halftone--.
    Line 55, "for the" should read --for smoothing the--.
    Line 56, "in" should read --by--.

<u>COLUMN 6</u>:

Line 11, "inputting method comprising the steps of" should be deleted.
    Line 25, "memories" should read --memories for delaying--.
    Line 35, "image" should read --digital image--.

Signed and Sealed this

Eighth Day of July, 1997

BRUCE LEHMAN

*Attest:*

*Attesting Officer*     Commissioner of Patents and Trademarks